(12) United States Patent
Maheshwari

(10) Patent No.: US 8,457,057 B2
(45) Date of Patent: Jun. 4, 2013

(54) ADAPTIVE ARQ BLOCK SIZE FOR WIRELESS NETWORKS

(75) Inventor: Shashikant Maheshwari, Irving, TX (US)

(73) Assignee: Nokia Siemens Networks Oy, Espoo (FI)

(*) Notice: Subject to any disclaimer, the term of this patent is extended or adjusted under 35 U.S.C. 154(b) by 537 days.

(21) Appl. No.: 12/761,580

(22) Filed: Apr. 16, 2010

(65) Prior Publication Data

US 2010/0265903 A1 Oct. 21, 2010

Related U.S. Application Data

(60) Provisional application No. 61/170,103, filed on Apr. 16, 2009.

(51) Int. Cl.
*H04W 4/00* (2009.01)

(52) U.S. Cl.
USPC ........................................ 370/329; 714/748

(58) Field of Classification Search
USPC ........... 370/328–329, 342–343; 714/748–749
See application file for complete search history.

(56) References Cited

U.S. PATENT DOCUMENTS

| | | | |
|---|---|---|---|
| 8,311,029 B2* | 11/2012 | Chang et al. | 370/329 |
| 2003/0079169 A1* | 4/2003 | Ho et al. | 714/748 |
| 2006/0251015 A1* | 11/2006 | Khan | 370/329 |
| 2007/0104129 A1* | 5/2007 | Yang et al. | 370/329 |
| 2007/0165565 A1* | 7/2007 | Jung et al. | 370/329 |
| 2008/0137601 A1* | 6/2008 | Sung et al. | 370/329 |
| 2009/0116436 A1* | 5/2009 | Okuda | 370/329 |
| 2010/0054189 A1* | 3/2010 | Chang et al. | 370/328 |
| 2011/0085508 A1* | 4/2011 | Wengerter et al. | 370/329 |

OTHER PUBLICATIONS

Selea, "ARQ Block Size in 802.16", Apr. 15, 2004, IEEE 802.16 Broadband Wireless Access Working Group, all pages.*
"Part 16: Air Interface for Fixed Broadband Wireless Access Systems", IEEE Standard for Local and Metropolitan Area Networks, IEEE Computer Society and the IEEE Microwave Theory and Techniques Society, Oct. 1, 2004, 894 pages.

(Continued)

*Primary Examiner* — Jeffrey M Rutkowski
(74) *Attorney, Agent, or Firm* — Brake Hughes Bellermann LLP

(57) ABSTRACT

Various example embodiments are disclosed. According to an example embodiment, a technique may include participating in an automatic repeat request (ARQ)-enabled service flow between first and second wireless stations, wherein each transmitted MAC (media access control) protocol data unit (PDU) is partitioned into one or more ARQ-blocks, with each ARQ-block, except a last ARQ block of a MAC PDU, having a fixed size equal to an ARQ-block-size, negotiating a change to the ARQ-block-size for the service flow via a request and response message exchange. In another embodiment, a technique may include transmitting an ARQ block size change request for a service flow from a first wireless station to a second wireless station, the ARQ block size change request including one or more parameters relating to a new ARQ-block-size for the service flow; receiving, at the first wireless station from the second wireless station, an ARQ block size change response for the service flow in response to the transmitting the ARQ block size change request; and implementing the new ARQ-block size for the service flow based on the received ARQ block size change response.

26 Claims, 9 Drawing Sheets

OTHER PUBLICATIONS

"Part 16: Air Interface for Fixed and Mobile Broadband Wireless Access Systems, Amendment 2: Physical and Medium Access Control Layers for Combined Fixed and Mobile Operation in Licensed Bands and Corrigendum 1", IEEE Standard for Local and metropolitan area networks, 2005, pp. 1 and 175-179.

"Part 16: Air interface for fixed Broadband Wireless Access systems", IEEE draft standard for Local and Metropolitan Area Networks, IEEE Computer Society and the IEEE Microwave Theory and Techniques Systems, Oct. 1, 2004, 12 pages.

"Technical Specification Group Radio Access Network", 3GPP, 3rd Generation Partnership Project, Evolved Universal Terrestrial Radio Access (E-UTRA) Radio Link Control (RLC) protocol specification, Release 8, 3GPP TS 36.322 V8.5.0, Technical Specification, Mar. 2009, 39 pages.

Chang, Youngbin, "2nd ARQ DG AWD Draft", IEEE 802.16 Broadband Wireless Access Working Group, Apr. 7, 2009, 10 pages.

Cudak, Mark, "IEEE 802.16m System Requirements", Motorola, IEEE 802.16 Broadband Wireless Access Working Group, IEEE 802.16m-07/002r4, Oct. 19, 2007, pp. 1-26.

"Part 16: Air Interface for Broadband Wireless Access Systems", DRAFT Standard for Local and metropolitan area networks, LAN/MAN Standards Committee of the IEEE Computer Society, IEEE Microwave Theory and Techniques Society, P802.16Rev2/D5, Revision of IEEE Std 802.16-2004, Jun. 2008, 2040 pages.

* cited by examiner

ADAPTIVE ARQ BLOCK SIZE FOR WIRELESS NETWORKS

PRIORITY CLAIM

This Application claims priority to U.S. Provisional Application No. 61/170,103, filed Apr. 16, 2009, entitled, "Adaptive ARQ Block Size for Wireless Networks," the disclosure of which is hereby incorporated by reference in its entirety.

TECHNICAL FIELD

This description relates to wireless networks.

SUMMARY

The details of one or more implementations are set forth in the accompanying drawings and the description below. Other features will be apparent from the description and drawings, and from the claims.

DETAILED DESCRIPTION

Figure 1:
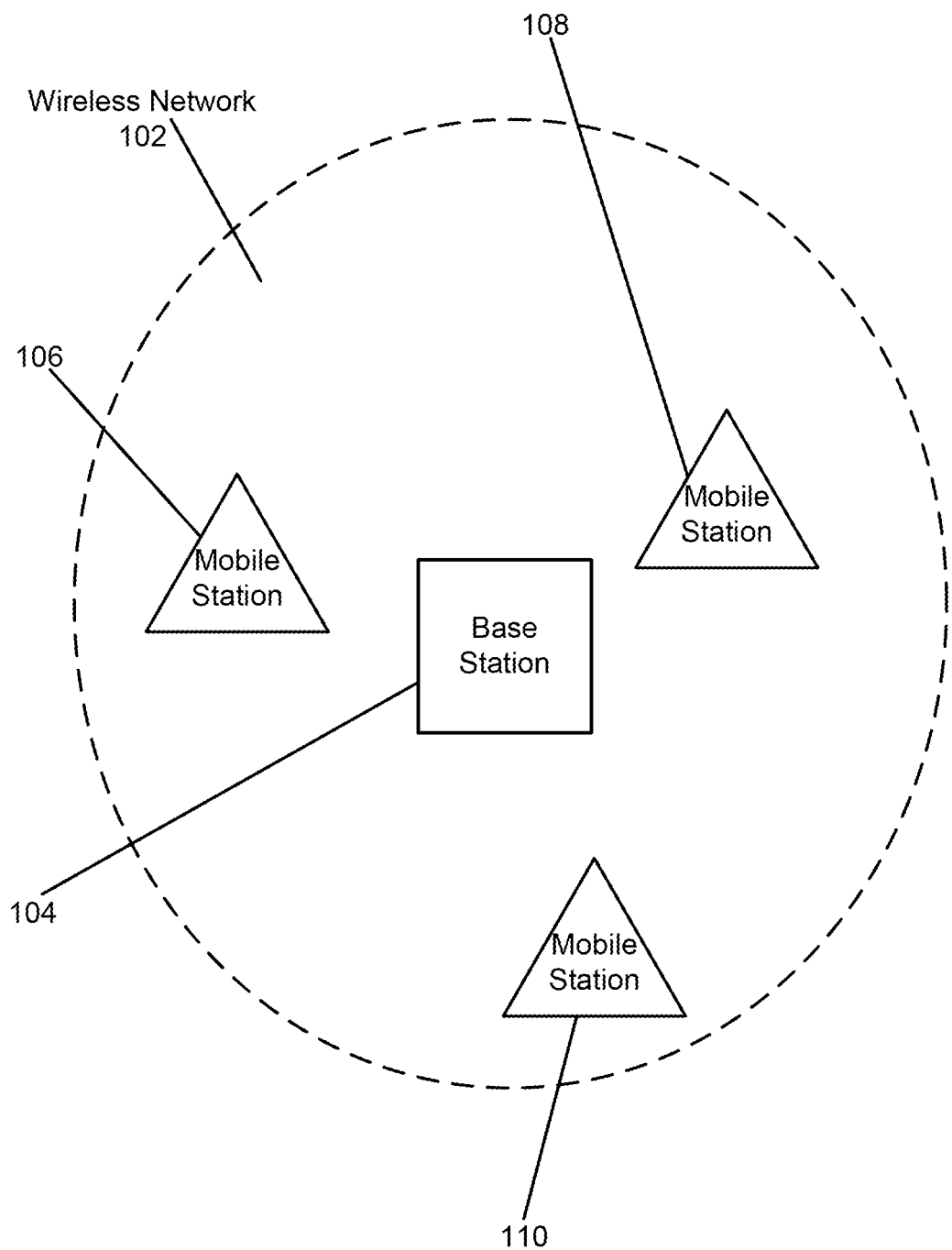
FIG. 1 is a block diagram of a wireless network according to an example embodiment.

FIG. 1 is a block diagram of a wireless network 102 including a base station 104 and three mobile stations 106, 108, 110 according to an example embodiment. While only three mobile stations are shown, any number may be provided. Although not shown, mobile stations 106, 108 and 110 may be coupled to base station 104 via relay stations or relay nodes, for example. The wireless network 102 may include, for example, an IEEE 802.16 Worldwide interoperability for Microwave Access (WiMAX) network, an IEEE 802.11 Wireless Local Area Network (WLAN) network, a cellular telephone network, or other wireless network, according to example embodiments. The base station 104 may include a cellular or WiMAX base station (BS), a node B, an 802.11 access point, or other infrastructure node, according to various example embodiments. The term "base station" (BS) may be used herein and may include any type of infrastructure node. The mobile stations 106, 108, 110 may include laptop or notebook computers, smartphones, personal digital assistants (PDAs), cellular telephones, WiMAX device, subscriber station, or any other wireless device, according to example embodiments. The term "wireless node" (or "wireless station") may include any type of wireless node, such as base stations, mobile stations, relay stations, etc. While the present disclosure may use some of the terminology of WiMAX or other wireless standards or specifications, the present disclosure may be applicable to any networking or wireless technologies. Base station (BS) 104 may transmit information (e.g., either broadcast, multicast or unicast) in a downlink (DL) direction to each mobile station (MS) 106, 108, 110, and each MS 106, 108, 110 may transmit information to the BS 104 in an uplink (UL) direction.

Figure 2:
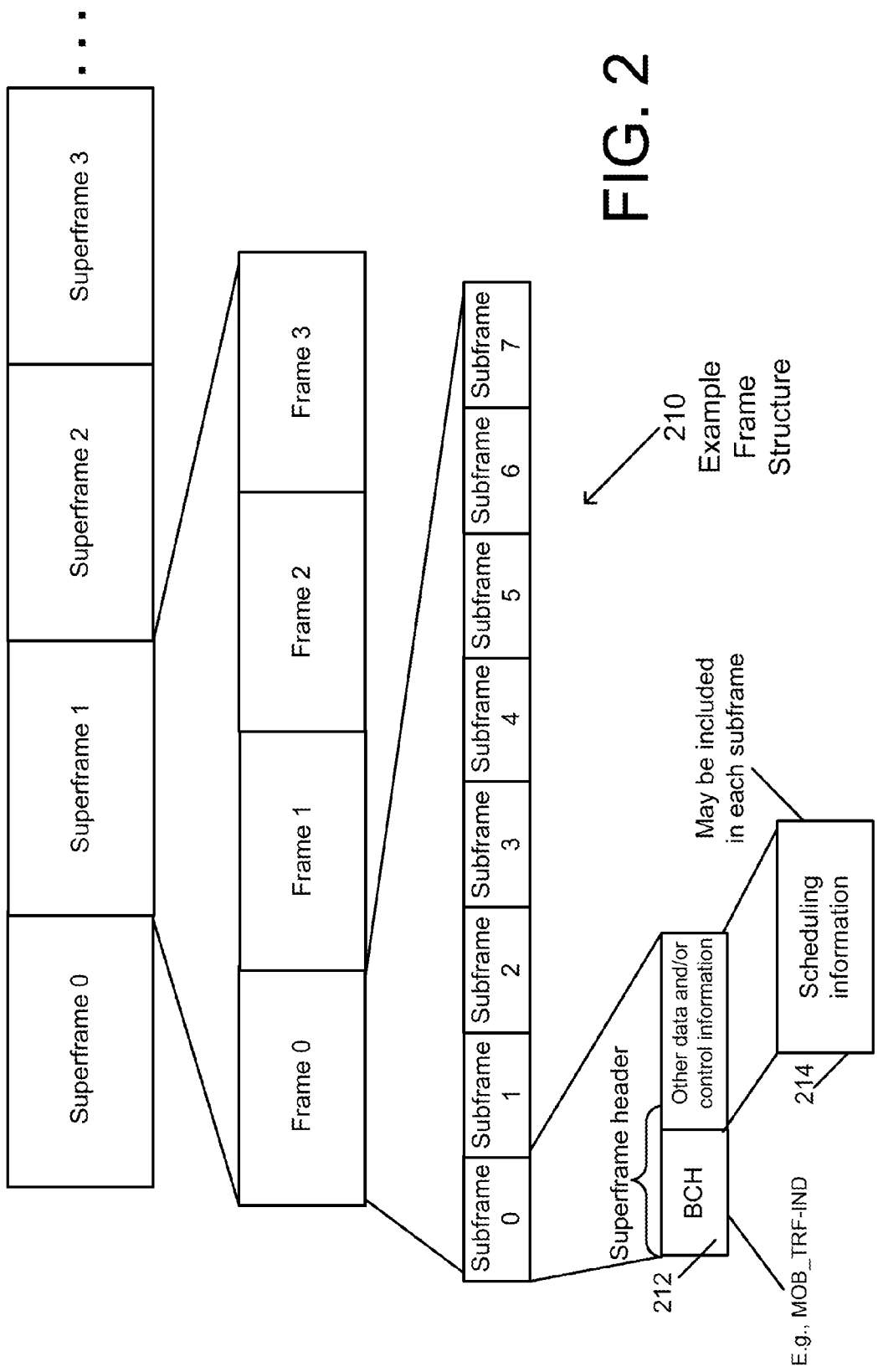
FIG. 2 is a diagram illustrating a frame structure according to an example embodiment.

FIG. 2 is a diagram illustrating a frame structure 210 according to an example embodiment. As shown in FIG. 2, several superframes are shown, including superframe 0, superframe 1, superframe 2, superframe 3. Each superframe may include a number of frames, such as, for example, four frames per superframe. Each frame may include a number of subframes, such as, for example, eight subframes per frame. For example, as shown, frame 1 may include eight subframes, such as subframes 0-7. Thus, according to an example embodiment, a superframe may include 32 subframes, although any number of subframes may be used. Each subframe may include transmission resources, such as, for example, a number of Orthogonal Frequency Division Multiplexing (OFDM) symbols, e.g., across one or more subcarriers. For example, each subframe may include 5-7 OFDM symbols, depending on a type of the subframe. These are merely examples, and a subframe may include any number of resources or OFDM symbols.

Each subframe may be allocated by BS 104 for either DL transmission or UL transmission. The DL/UL ratio for subframes within a frame may vary, based on control information indicated or transmitted by the BS 104. For example, the DL/UL ratio may be 4/4 (meaning, the frame includes 4 DL subframes followed by 4 UL subframes), may be 5/3, or 3/5 or other ratio, depending on the UL and DL traffic in the network. For example, one or more DL subframes may occur first in a frame for the BS 104 to transmit broadcast and unicast information to MSs, followed by one or more UL subframes that may allow one or more of the MSs opportunities or resources to transmit UL to the BS 104.

Referring to FIG. 2 again, the first subframe (subframe 0 in FIG. 2) of each superframe is typically allocated for downlink transmission. Each superframe may include a superframe header (SFH) that is included in the first subframe of the superframe (subframe 0) of the first frame (frame 0) of the superframe. The SFH may include a number of fields, including a broadcast channel (BCH) 212. The BCH 212 may be used by the BS 104 to broadcast to all MSs or provide essential system parameters and system configuration information 214. The BCH 212 may include a primary broadcast channel (PBCH) and a secondary broadcast channel (SBCH). The PBCH may carry deployment wide (or network wide) common information from the BS, while the SBCH may carry sector specific information, where MSs in wireless network 102 may be divided into different sectors. In an example embodiment, the BCH 212 may be frequency division multiplexed with data within the same subframe (subframe 0).

As noted, BCH 212, e.g., provided within a first subframe of a superframe, may include system configuration information 214. System configuration information 214 may include or describe the system configuration of one or more (or each) of the subframes of a superframe. In some cases, the system configuration information 214 may be considered essential for decoding subframes. System configuration information 214 may include, for example, DL/UL ratio for subframes within the superframe (e.g., first 5 subframes are for DL, and last 3 subframes are for UL), subframe concatenation pattern for a superframe, the configuration information of localized resource allocations (LRAs) and distributed resource allocations (DRAs) within a subframe (which may allocate resources for UL or DL transmissions), permutation method for subcarriers, and/or other system configuration information.

As shown in FIG. 2, each subframe may include other data and control information. Although, FIG. 2 only shows the other data and control information for subframe 0, each subframe may include other data and control information. For example, each subframe may include scheduling information that may schedule, assign or allocate resources to each of the MSs for UL or DL transmissions. The scheduling information in a subframe may allocate or assign resources to a MS for the same subframe, or a future subframe, as examples.

In an example embodiment, the scheduling information may be provided in (or as part of) a unicast service control channel or a Map message. These are merely some examples, and the scheduling information may be provided in a number of different formats, or may be known by different names. The scheduling information may include, for example, MS-specific (e.g., user-specific or connection-specific) scheduling assignments to assign or allocate UL or DL resources to different MSs. The scheduling assignments may be for unicast transmissions (either uplink or downlink), or DL multicast or broadcast transmissions (e.g., where a MS may be a member of one or more multicast groups).

IEEE 802.16e specification defines an ARQ (automatic repeat request) block transmission that allows acknowledgement/negative acknowledgement (ACK/NAK) information to be sent from a receiver to a wireless transmitter for ARQ blocks. Unfortunately, in 802.16e, once the connection or flow service is set up, the size of the ARQ blocks is fixed, and cannot be adjusted. This may create problems when a mobile station moves location, or where channel conditions may change. For example, according to an example embodiment, a ARQ block size may be negotiated by MS and BS, e.g., 16 bytes, and works well when the MS is on the edge of a cell where channel conditions (e.g., received signal strength, signal to interference and noise ratio, error rates, etc.), are acceptable, but not great. When the MS moves to the center of the cell, the channel conditions will likely improve, which would normally allow higher data rates. However, the low ARQ block size may typically limit the effective data rate that the MS and BS may achieve.

Therefore, according to an example embodiment, a more flexible approach is described herein where, e.g., for an ARQ-enabled connection or service flow, the ARQ block size may be changed or updated or adapted, e.g., based on changing conditions or needs of the stations. This may allow a MS or BS to change the ARQ block size for a service flow as necessary, for example. A 3-way handshake is provided that allows two stations (e.g., MS and BS) to update the ARQ block size for a service flow.

In an example embodiment, a MS and BS may participate in an ARQ-enabled service flow. The participation in an ARQ-enabled service flow may also include using dynamic service addition messages, such as IEEE 802.16 Dynamic Service Addition (DSA) Request (to request a new service flow) and DSA Response (to acknowledge the request) messages. Either MS or BS may request adding a new service flow. After a MS has performed network authentication and registration, the BS may automatically use DA request message to add one or more service flows for or with the MS, or the MS may sometimes request adding a new service flow.

The participation in an ARQ-enabled service flow may also include, for example, a transmitting station (e.g., BS) transmitting data to a receiving station (e.g., MS) as part of the service flow, the receiving station receiving data. As part of this, the BS may partition each MAC PDU into one or more ARQ blocks, with each ARQ block being associated with a block sequence number (or BSN). The BSNs may be used in an ARQ protocol, using the acknowledgement/negative acknowledgement information that may be sent to a BS, to allow the BS or transmitting station to keep track of which ARQ blocks have been received, and which ARQ blocks were not received (and thus, need to be retransmitted). The participation may also include MS detecting any errors or lost packets (packets not received), e.g., via use of a CRC calculation or other error detection technique. The MS or receiving station may send acknowledgement/negative acknowledgement information for the ARQ blocks to the transmitting station via, for example, an ARQ Feedback IE (information element), and the transmitting station may retransmit one or more lost ARQ blocks to the receiving station or MS. The participation in an ARQ-enabled service flow may also include using dynamic service addition messages, such as IEEE 802.16 Dynamic Service Addition (DSA) Request (to request a new service flow) and using DSA Response messages (to acknowledge the request). Either MS or BS may request adding a new service flow. After a MS has performed authentication or registration, the BS may automatically use DSA request message (as an example) to add one or more service flows, or the MS may sometimes request adding a new service flow, e.g., via a DSA request message.

According to an example embodiment, a transmitting wireless station, e.g., a BS, and a receiving wireless station, e.g., a MS, may negotiate a change to the ARQ block size that is used for a service flow or connection. This may be done, for example, via a 2-way or 3-way handshake between MS and BS, which example embodiments thereof are described in greater detail hereinbelow and shown in FIG. 4.

Figure 3:
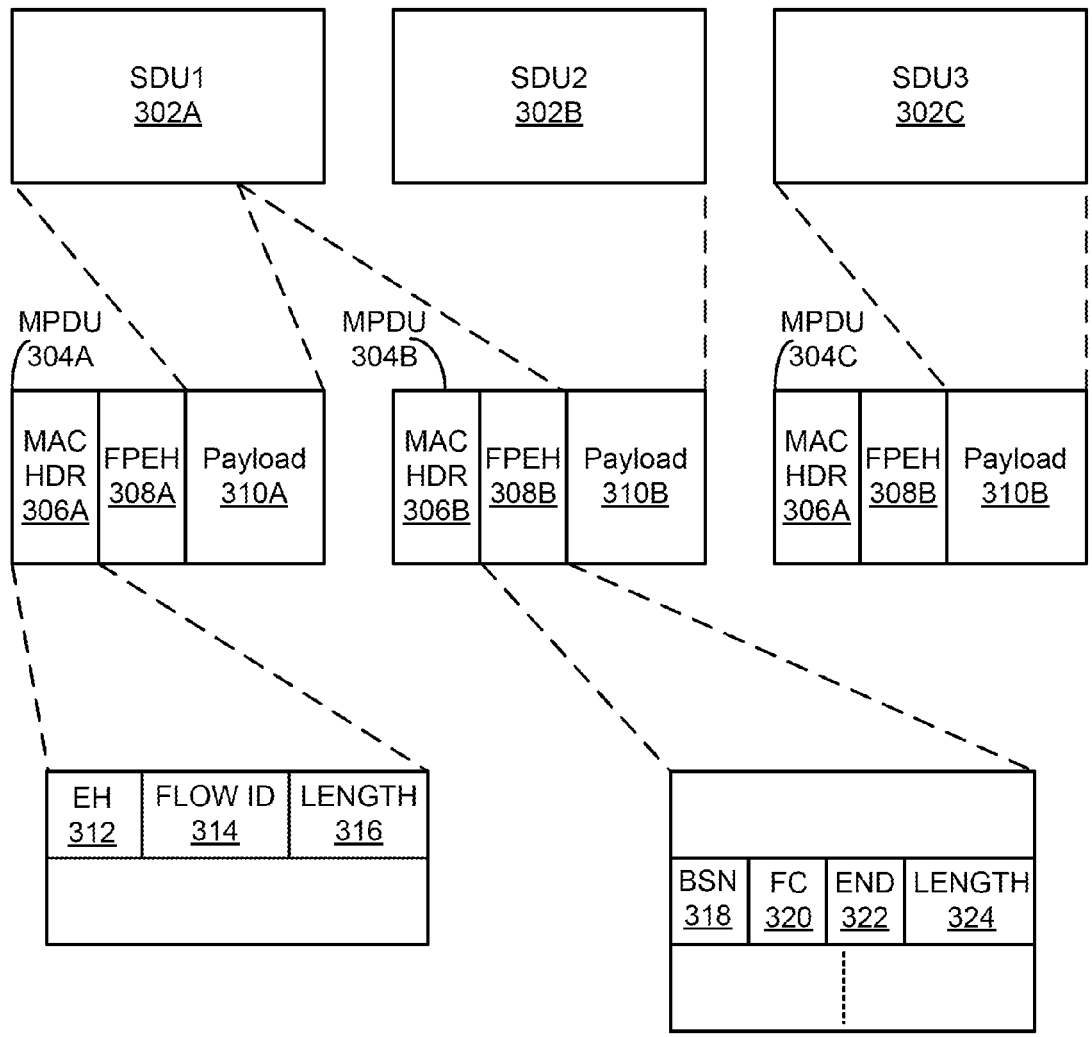
FIG. 3 is a diagram illustrating frame formats according to an example embodiment.

FIG. 3 illustrates examples of frame formats according to an example embodiment. Several service data units are shown, including service data unit (SDU) 1 302A, SDU2 302B, and SDU3 302C. A MAC layer of a wireless station (e.g., BS) may transmit each SDU 302A, 302B, 302C via one or more MAC (media access control) protocol data units, or MAC PDUs 304A, 304B, 304C. If a station's MAC has sufficient resources, a SDU 302A, 302B, 302C may be transmitted within a MAC PDU 304A, 304B, 304C, which may be referred to as packing If sufficient resource are not available, then the SDU 302A, 302B, 302C may be fragmented and transmitted in multiple MAC PDUs 304A, 304B, 304C, which may be referred to as fragmentation. Each MPDU 304A, 304B, 304C may include a MAC header 306A, 306B, 306C, a fragmentation and packing extended header (FPEH) 308A, 308B, 308C, and a payload 310A, 310B, 310C.

The MAC header 306A, 306B, 306C may include an extended header (EH) 312, which is 1 bit to indicate if more extended headers are present; a flow ID 314; and length 316, which may be 11 bits to indicate a size of the first fragment of first SDU 302A. The FPEH 308A, 308B, 308C (within a MAC PDU) 304A, 304B, 304C may include a BSN or block sequence number 318, which may be a 10 or 11 bit number to indicate the starting BSN used in this MAC PDU (or MPDU) 304A, 304B, 304C. The FPEH 308A, 308B, 308C may also include a flow control (FC) field 320. The FPEH 308A, 308B, 308C may also include an End bit 322 that is set to 1 to indicate another length field is present. The FPEH 308A, 308B, 308C may include a length field may be included which indicates a length of the FPEH 308A, 308B, 308C. A number of ARQ blocks present may be calculated based on a ceiling, such as a length divided by ARQ block size. If N SDUs are positively acknowledged, then an N−1 length field may be present in the FPEH 308A, 308B, 308C.

Figure 4A:
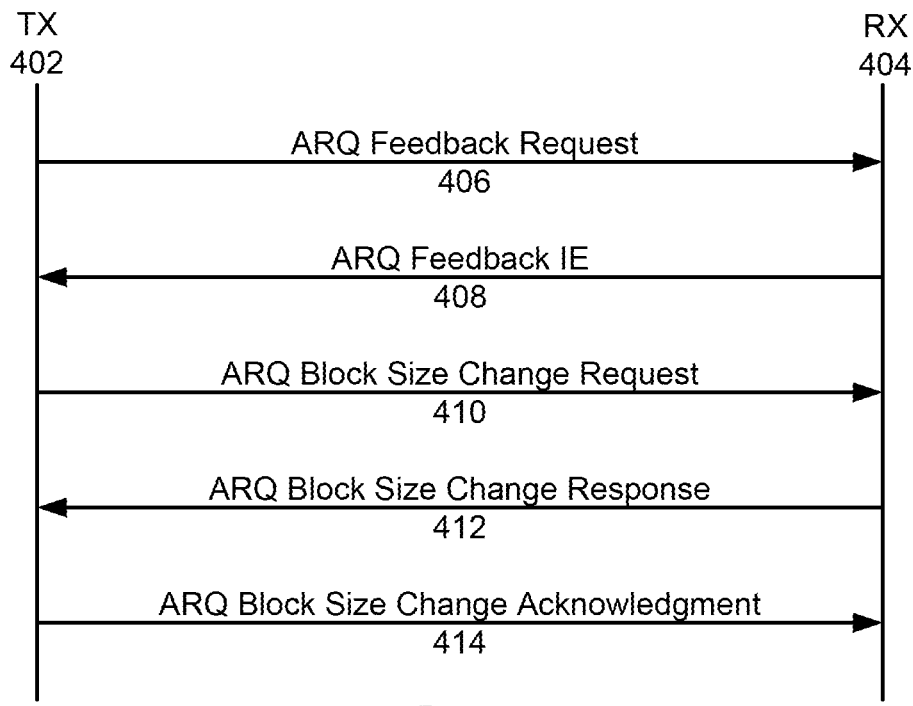
FIG. 4A is a timing diagram illustrating signaling procedure according to an example embodiment.

FIG. 4A is a timing diagram illustrating signaling procedure that may be used by a transmitting station 402 or receiving station 404 to change the ARQ block size according to an example embodiment. In an example embodiment, as a precondition to updating or changing the ARQ block size (at least in one example embodiment), a transmitting station 402 may request and obtain ARQ feedback (or ACK/acknowledgement and/or NAK/negative acknowledgement) information for one or more previously transmitted ARQ blocks. Thus, in a first message, an ARQ feedback request 406 is transmitted from a transmitting station 402 to a receiving station 404. In a second message, an ARQ feedback IE 408 is provided by the receiving station 404, and may include ACK and/or NAK information for one or more previously transmitted ARQ blocks, so that the transmitting station 402 will know which ARQ blocks may need to be retransmitted, for example.

Referring to FIG. 4A, in a third message, the transmitting station 402 (e.g., BS), may transmit an ARQ block size change request 410 to the receiving station 404. In an example embodiment, the ARQ block size change request 410 may include one or more parameters relating to a new ARQ block size, such as, for example, one or more of: 1) a new ARQ block size, e.g., 16 byes, 32 bytes, 48 bytes, . . . 1024 bytes, and 2) a time or frame offset indicating a time at which the new ARQ block size will begin or become effective. At that point, typically, transmitted ARQ blocks will use the new ARQ block size, and at the receiver, the receiving station 404 will decode received data based on the new ARQ block size. The ARQ block size change request 410 may also include 3) a starting BSN (block sequence number) that applies at the time or frame offset indicated in 2). Generally, the starting BSN may be one of a number of different values, such as a next BSN (previous BSN used for old block size+1), any BSN, Next expected in order BSN, a future BSN (which may skip some sequence numbers after a last ACKed block), or a default or reset sequence number, which may be for example zero. Thus, in FIG. 4A, first the transmitting station 402 may request and obtain updated ARQ feedback information, and then may request a change to the ARQ block size.

Figure 4B:
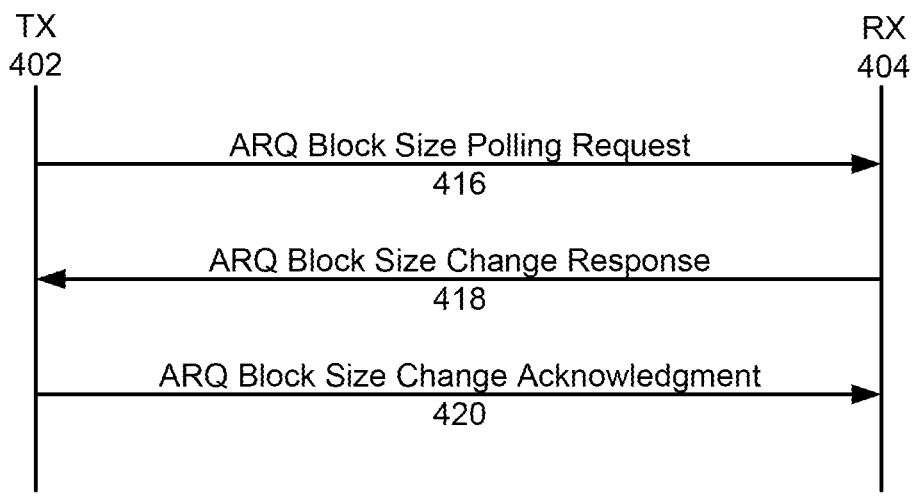
FIG. 4B is a timing diagram illustrating signaling procedure according to another example embodiment.

FIG. 4B is a timing diagram illustrating signaling procedure that may be used by a transmitting station 402 or receiving station 404 to change the ARQ block size according to another example embodiment. In this example embodiment, a first message may include, for example, both an ARQ block size change request and a request for ARQ feedback information 416. Thus, the request for ARQ feedback may be provided before (as in FIG. 4A), or during/in parallel with the ARQ block size change request (as in FIG. 4B). The second message of FIG. 4B may include an ARQ block size change response 418 and ARQ feedback transmitted by a receiving station 404 to the transmitting station 402. Transmitting station 402 may be transmitting data via the service flow, and receiving station 404 may be receiving data via the one-way service flow, for example. The third message may include an ARQ block size change Ack 420 that acknowledges receipt for the ARQ block size change response. This 3-way handshake allows the MS and BS to negotiate or change the ARQ block size for an existing service flow. Note that in FIGS. 4A and 4B, each station may reject the proposed or requested new block size or other parameters, and may reply or respond (in the response message 412, 418) with its own suggested or proposed block size, for example. The polling requests may be included with either the requests or responses, and the ARQ feedbacks may be included with either the responses or the acknowledgments, or with the requests, according to example embodiments.

Figure 5:
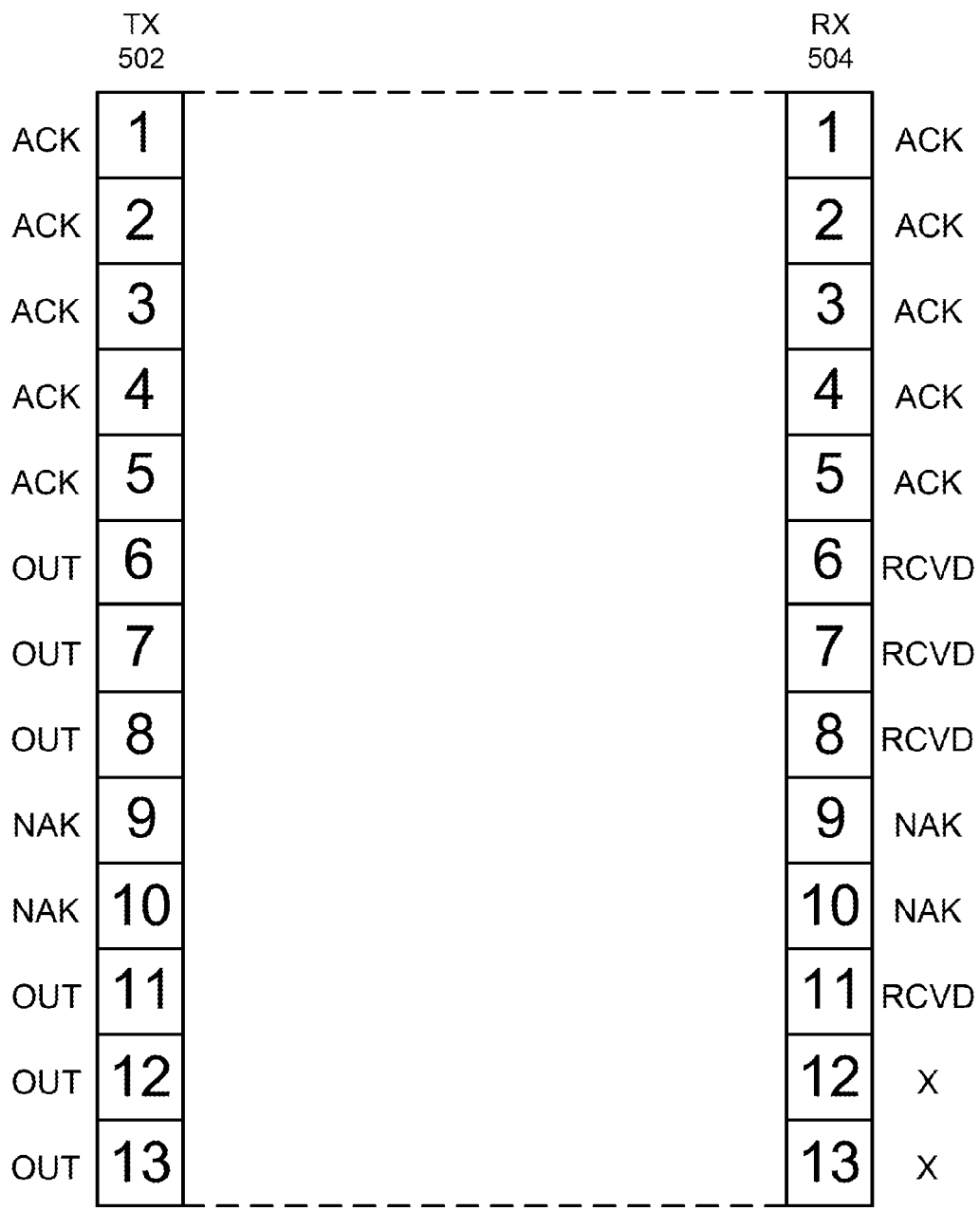
FIG. 5 illustrates an example of an ACK/status that may exist for a service flow between transmitting and receiving stations.

FIG. 5 illustrates an example of a ACK/NAK status that may exist for a service flow between a transmitting and receiving stations 502, 504. The designation ACK may indicate that the block was transmitted and acknowledged by the receiver, RCVD may indicate that the block was received by the receiver but not yet acknowledged by the receiver, OUT may indicate that the block was transmitted but not yet acknowledged by the receiver, NAK may indicate that the block was transmitted but negatively acknowledged by the receiver and needs to be retransmitted, and X may indicate that the block was not received. There are some blocks that have been transmitted and ACKed (ARQ blocks 1-5), transmitted but not yet Acked by receiver (ARQ blocks 6-8), NAKed (blocks 9-10), transmitted and received but not Acked (11), and transmitted but not yet received (12-13). This is merely an example.

A starting BSN for the new block size may be assigned based on, e.g., the ARQ blocks that have been ACKed, or NAKed, and whether a reset or default value is selected, and/or whether the block size is increasing (new block size is greater than old block size) or decreasing (new block size is less than old block size), as some examples.

In a case where the ARQ block size is increasing, e.g., old block size is 16 bytes, and new block size is 64 bytes, there is significant flexibility in identifying a new or starting BSN for the new block size. The starting BSN for the new ARQ block size may be selected as one of, for example: 1) BSN_expected_in order+1, or the next expected BSN in order, at the receiver (or block 9 in FIG. 5 example); 2) starting BSN explicitly provided by transmitter (BS); 3) reset to zero or other default value, after sending ARQ feedback and Acked by Receiver message or ACK; 4) BSN.expected.next, or next highest expected BSN at receiver, e.g., block 12 in FIG. 5.

In an example embodiment, if a starting BSN for the new ARQ block size is selected as the last transmitted+1, then this means all the transmitted blocks have been ACKed. Thus, in such case, the first block of the new size may use the new size, and no retransmissions of the old block size are needed.

In another example embodiment, if the starting BSN for the new block size is equal to or greater than the next highest expected BSN at receiver (BSN expected.next, or block 12 in FIG. 5), then all previous BSNs (prior to start of new block size becoming effective or having a sequence number that is less than BSN_expected next) will be transmitted/retransmitted using old ARQ block size. Others, or subsequent BSNs may be transmitted with new block size, for example. In another example embodiment, if starting BSN for new block size is equal to zero or other default, or equal to BSN-expected.next (next highest expected BSN at receiver or block 12 in FIG. 5 example), then all ARQ blocks transmitted after completion of signaling exchange or with a higher BSN will be transmitted with new ARQ block size. For example, if blocks 1-19 have been transmitted, blocks 1-10 have been ACKed (10 is highest ACKed block), blocks 11-19 have not been ACKed, and 20 is selected as starting BSN for new block size. In this case, blocks 11-19 would be retransmitted using old block size, and blocks 20, 21, 22, etc. are transmitted using new block size. This is simply another example.

In another example embodiment, where ARQ block size is decreasing, e.g., from 256 bytes to 16 bytes. ARQ feedback may be requested and obtained by transmitting station 502, either before or together with ARQ block size change request/ response messages, respectively. In this case, the MS or receiving station is unable to transmit ARQ blocks using the larger size, e.g., due to lower channel quality, limited UL power and coverate. In this case, outstanding (out) blocks may need to be remapped to the new block size and adjust the BSN accordingly. Starting BSN may be, for example, BSN reset=0, or BSN-expected in order (or block 9 in example of FIG. 5). Referring to the example in FIG. 5, old BSN (256 byte) block 9 should be transmitted via 16 of the new, smaller (16 byte) blocks with BSNs 9-25; old 256 byte block 10 should be transmitted via new blocks 25-41. Old BSN 11 was received at receiver, and thus, may be retransmitted via new blocks 41-57, or may be skipped, since both transmitter 502 and receiver 504 know that old block 11 was successfully received (already ACKed). Old blocks 12, et. sequence, are transmitted, or retransmitted via new blocks, continuing the new BSN sequence.

Figure 6:
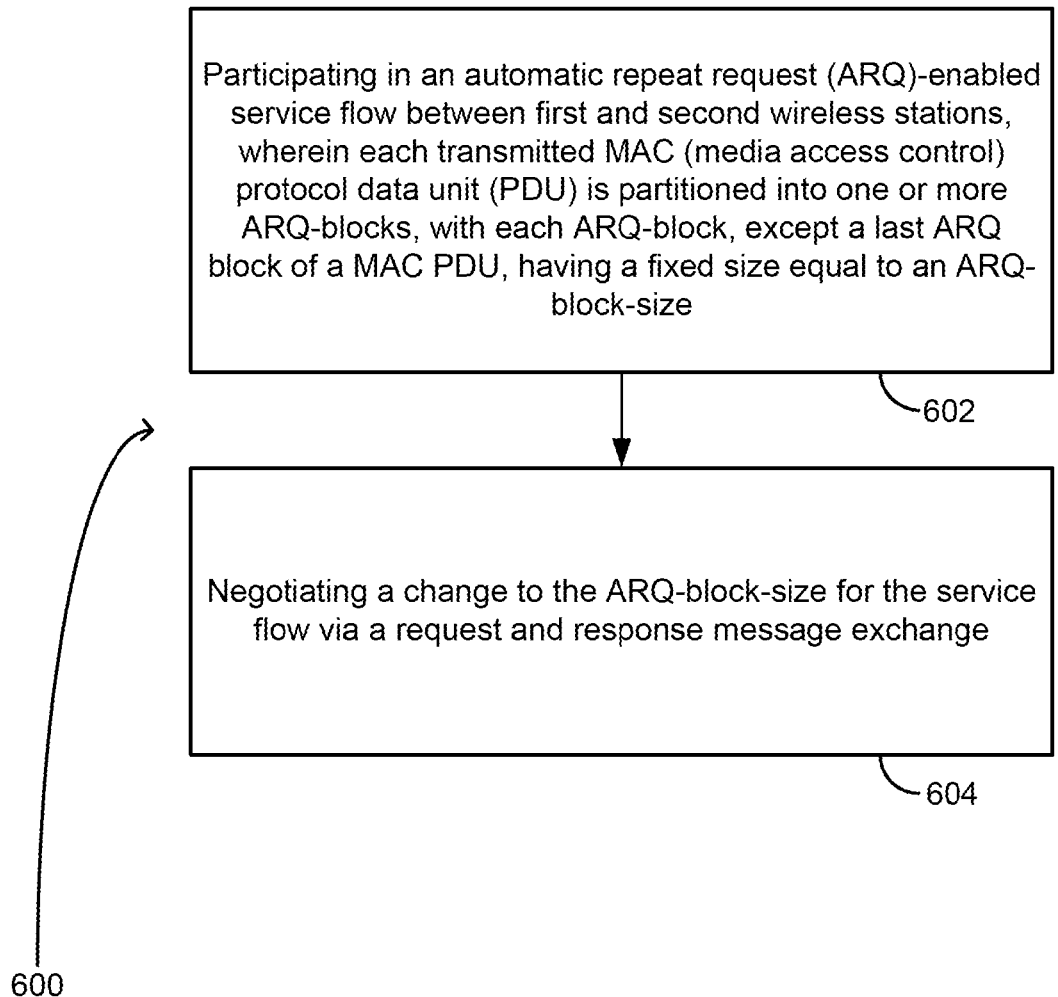
FIG. 6 is a flowchart of a method according to an example embodiment.

FIG. 6 is a flowchart of a method 600 according to an example embodiment. According to an example embodiment, the method 600 may include: participating in an automatic repeat request (ARQ)-enabled service flow between first and second wireless stations, wherein each transmitted MAC (media access control) protocol data unit (PDU) is partitioned into one or more ARQ-blocks, with each ARQ-block, except a last ARQ block of a MAC PDU, having a fixed size equal to an ARQ-block-size (602); and negotiating a change to the ARQ-block-size for the service flow via a request and response message exchange (604).

In the method 600, the participating (602) may include either transmitting or receiving data for the service flow. In the method 600, the participating (602) may include: establishing the ARQ-enabled service flow between the first and second wireless stations; and transmitting data from the first wireless station to the second wireless station for the ARQ-enabled service flow.

In the method, the negotiating (604) may include: transmitting an ARQ block size change request for the service flow from the first wireless station to the second wireless station, the ARQ block size change request including one or more parameters relating to a new ARQ-block-size for the service flow; receiving, at the first wireless station from the second wireless station, an ARQ block size change response for the service flow in response to the transmitting the ARQ block size change request; and transmitting, from the first wireless station to the second wireless station, an ARQ block size change acknowledgement for the service flow in response to receiving the ARQ block size change response.

The negotiating (604) may include: receiving an ARQ block size change request for the service flow at the first wireless station from the second wireless station, the ARQ block size change request including one or more parameters relating to a new ARQ-block-size for the service flow; transmitting, from the first wireless station to the second wireless station, an ARQ block size change response for the service flow in response to the receiving the ARQ block size change request; and receiving, at the first wireless station from the second wireless station, an ARQ block size change acknowledgement for the service flow in response to the transmitting the ARQ block size change response.

In the method 600, one or more parameters relating to the new ARQ-block-size may include one or more of the following: the new ARQ-block size that identifies a new requested size of the ARQ blocks for the service flow; a time or frame offset that identifies when the new ARQ-block size will become effective; and/or a starting block sequence number associated with a first ARQ block that is transmitted on or after the time or frame offset when the new ARQ-block size will become effective.

In an example embodiment, the one or more parameters relating to the new ARQ-block-size may include: the new ARQ-block size that identifies a new requested size of the ARQ blocks for the service flow; a time or frame offset that identifies when the new ARQ-block size will become effective; and wherein a default value will be used as a starting block sequence number associated with a first ARQ block transmitted when the new ARQ-block size will become effective.

In an example embodiment, the default value of the starting block sequence number may be zero.

The method 600 may further include performing the following prior to the negotiating: transmitting, from the first wireless station to the second wireless station, an ARQ feedback request; and receiving an ARQ feedback response that provides acknowledgement information for one or more transmitted ARQ blocks.

The method 600 may further include performing the following prior to the negotiating: receiving, at the first wireless station from the second wireless station, an ARQ feedback request; and transmitting an ARQ feedback response that provides acknowledgement information for one or more transmitted ARQ blocks.

In an example embodiment, the negotiating (604) may include: transmitting a first message including an ARQ block size change request and an ARQ feedback request for the service flow from the first wireless station to the second wireless station, the ARQ block size change request including one or more parameters relating to a new ARQ-block-size for the service flow; receiving, at the first wireless station from the second wireless station, a second message that includes an ARQ block size change response and an ARQ feedback response for the service flow, the ARQ feedback response providing acknowledgement information for one or more transmitted ARQ blocks.

The method 600 may further include transmitting, from the first wireless station to the second wireless station, a third message that includes an ARQ block size change acknowledgement for the service flow in response to receiving the ARQ block size change response.

In an example embodiment, the negotiating (604) may include: receiving, at the first wireless station from the second wireless station, a first message that includes an ARQ block size change request and an ARQ feedback request for the service flow, the ARQ block size change request including one or more parameters relating to a new ARQ block size for the service flow; transmitting, from the first wireless station to the second wireless station, a second message that includes an ARQ block size change response and an ARQ feedback response for the service flow, the ARQ feedback response providing acknowledgement information for one or more transmitted ARQ blocks.

In an example embodiment, the negotiating (604) may include negotiating a change to the ARQ-block-size for the service flow via an IEEE 802.16 dynamic service change (DSC) request and a dynamic service change (DSC) response message exchange.

In an example embodiment, the negotiating (604) may include transmitting, from the first wireless station to the second wireless station, an ARQ block size change request for the service flow, the ARQ block size change request including one or more parameters relating to a new ARQ-block-size for the service flow; and wherein the transmitting the ARQ block size change request is performed in response to one or more of the following: one or more QoS parameters for the first wireless station for the service flow, or a change thereof; a buffer capacity for the first wireless station for the service flow, or a change thereof; and/or a measured channel quality for the service flow as measured by the first wireless station, or a change thereof, the measured channel quality including one or more of a measured received signal strength, measured interference, a measured signal to interference and noise ratio, and/or a measured error rate.

An apparatus at a wireless station may include at least one processor and at least one memory including computer program code configured to, with the at least one processor, participate in an automatic repeat request (ARQ)-enabled service flow between first and second wireless stations, wherein each transmitted MAC (media access control) protocol data unit (PDU) is partitioned into one or more ARQ-blocks, with each ARQ-block, except a last ARQ_block of a MAC PDU, having a fixed size equal to an ARQ-block-size; and negotiate a change to the ARQ-block-size for the service flow via a request and response message exchange.

An apparatus may include at least one processor, a wireless transceiver, and at least one memory including computer program code configured to, with the at least one processor, cause the apparatus to: transmit (wireless transceiver) an ARQ block size change request for a service flow from a first wireless station to a second wireless station, the ARQ block size change request including one or more parameters relating to a new ARQ-block-size for the service flow; receive (by wireless transceiver), at the first wireless station from the second wireless station, an ARQ block size change response for the service flow in response to the transmitting the ARQ block size change request; and implement (by processor, e.g., baseband processor) the new ARQ-block size for the service flow based on the received ARQ block size change response.

In an example embodiment, the one or more parameters may include one or more of the following: the new ARQ-block size that identifies a new requested size of the ARQ blocks for the service flow; a time or frame offset that identifies when the new ARQ-block size will become effective; and/or a starting (or first) block sequence number associated with a first ARQ block that is transmitted on or after the time or frame offset when the new ARQ-block size will become effective.

The apparatus wherein the one or more parameters may include: the new ARQ-block size that identifies a new requested size of the ARQ blocks for the service flow; and a time or frame offset that identifies when the new ARQ-block size will become effective; wherein a default value will be used for a starting block sequence number at the start of when the new ARQ-block size will become effective.

The apparatus wherein the default value for a starting block sequence number for the new block size may be zero.

In an example embodiment, the apparatus may be configured to transmit comprises the apparatus being configured to transmit the ARQ block size change request and an ARQ feedback request for the service flow from the first wireless station to the second wireless station, the ARQ block size change request including one or more parameters relating to a new ARQ-block-size for the service flow; wherein the apparatus being configured to receive comprises the apparatus receiving, at the first wireless station from the second wireless station, the ARQ block size change response and an ARQ feedback response for the service flow, the ARQ feedback response providing acknowledgement information for one or more transmitted ARQ blocks.

In an example embodiment, the apparatus may be configured to transmit comprises the apparatus being configured to transmit a dynamic service change request indicating an ARQ block size change request; and wherein the apparatus being configured to receive comprises the apparatus being configured to receive a dynamic service change response for the ARQ block size change request.

In the apparatus being configured to implement may include the apparatus, at a base station, being configured to partition each of one or more MAC (media access control) protocol data units (PDUs) for transmission into one or more ARQ blocks, with each ARQ block, except a last ARQ block of a MAC PDU, having a fixed size equal to the new ARQ-block-size.

In an example embodiment, the apparatus may be configured to implement comprises the apparatus, at a mobile station, being configured to receive and decode data based on the new ARQ-block size for the service flow.

The apparatus may be further configured to: transmit, from the first wireless station to the second wireless station, an ARQ block size change acknowledgement for the service flow in response to receiving the ARQ block size change response.

The apparatus may be configured to partition each of one or more MAC (media access control) protocol data units (PDUs) for transmission into one or more ARQ blocks, with each ARQ block, except a last ARQ block of a MAC PDU, having a fixed size equal to an ARQ-block-size; and wherein the apparatus being configured to implement comprises the apparatus being configured to partition MAC PDUs into ARQ blocks using the new ARQ block size.

Figure 7:
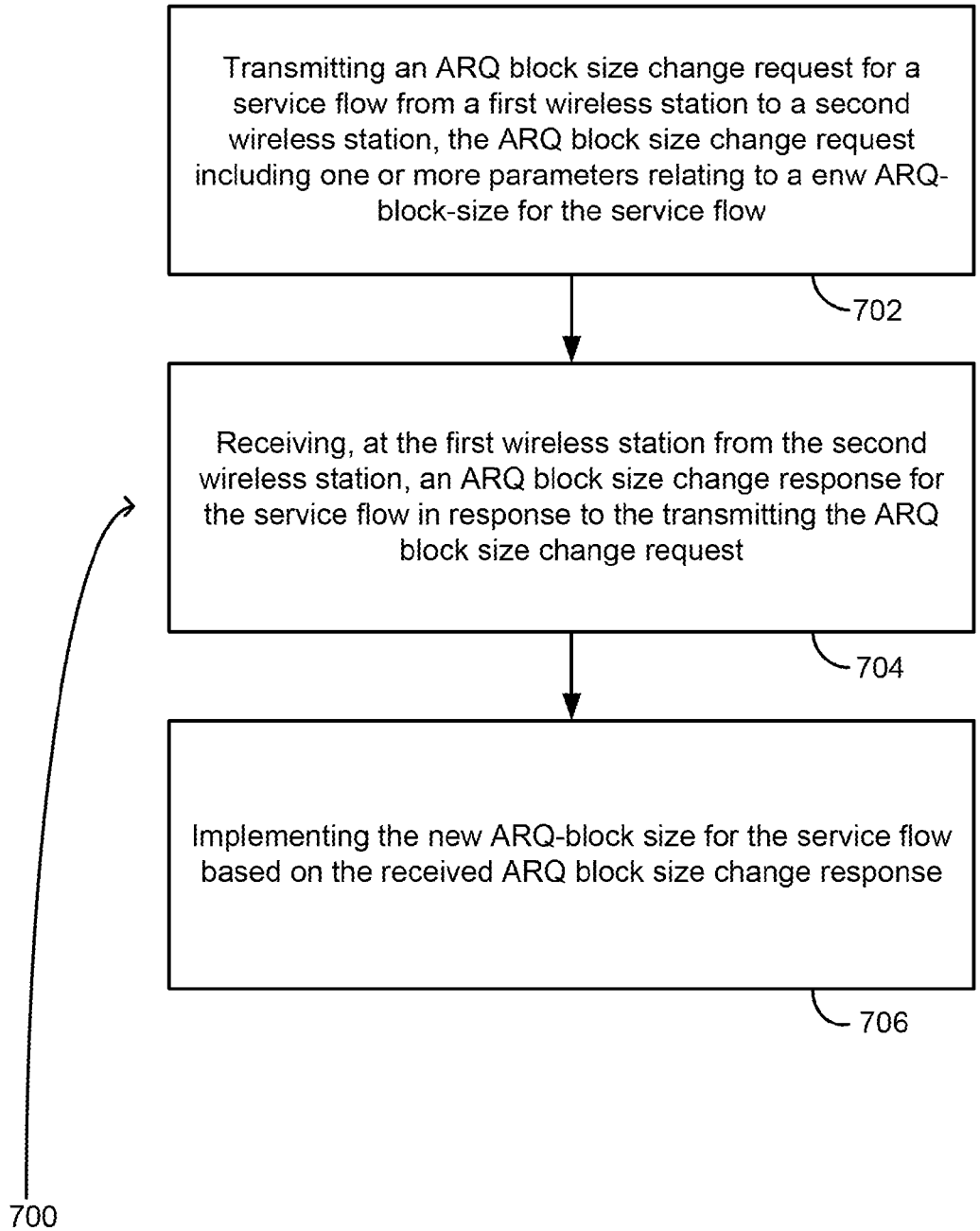
FIG. 7 is a flowchart of a method according to another example embodiment.

FIG. 7 is a flowchart of a method 700 according to an example embodiment. The method 700 may include transmitting an ARQ block size change request for a service flow from a first wireless station to a second wireless station, the ARQ block size change request including one or more parameters relating to a new ARQ-block-size for the service flow (702); receiving, at the first wireless station from the second wireless station, an ARQ block size change response for the service flow in response to the transmitting the ARQ block size change request (704); and implementing the new ARQ-block size for the service flow based on the received ARQ block size change response (706).

An apparatus may include: means for transmitting (e.g., wireless transceiver) an ARQ block size change request for a service flow from a first wireless station to a second wireless station, the ARQ block size change request including one or more parameters relating to a new ARQ-block-size for the service flow; means for receiving (e.g., wireless transceiver), at the first wireless station from the second wireless station, an ARQ block size change response for the service flow in response to the transmitting the ARQ block size change request; and means for implementing (e.g., processor, such as baseband processor) the new ARQ-block size for the service flow based on the received ARQ block size change response.

An apparatus may include at least one processor, a wireless transceiver, and at least one memory configured to, with the at least one processor, cause the apparatus to: receive an ARQ block size change request for a service flow at a first wireless station from a second wireless station, the ARQ block size change request including one or more parameters relating to a new ARQ-block-size for the service flow; transmit, from the first wireless station to the second wireless station, an ARQ block size change response for the service flow in response to the transmitting the ARQ block size change request; and implement the new ARQ-block size for the service flow based on the received ARQ block size change response.

Figure 8:
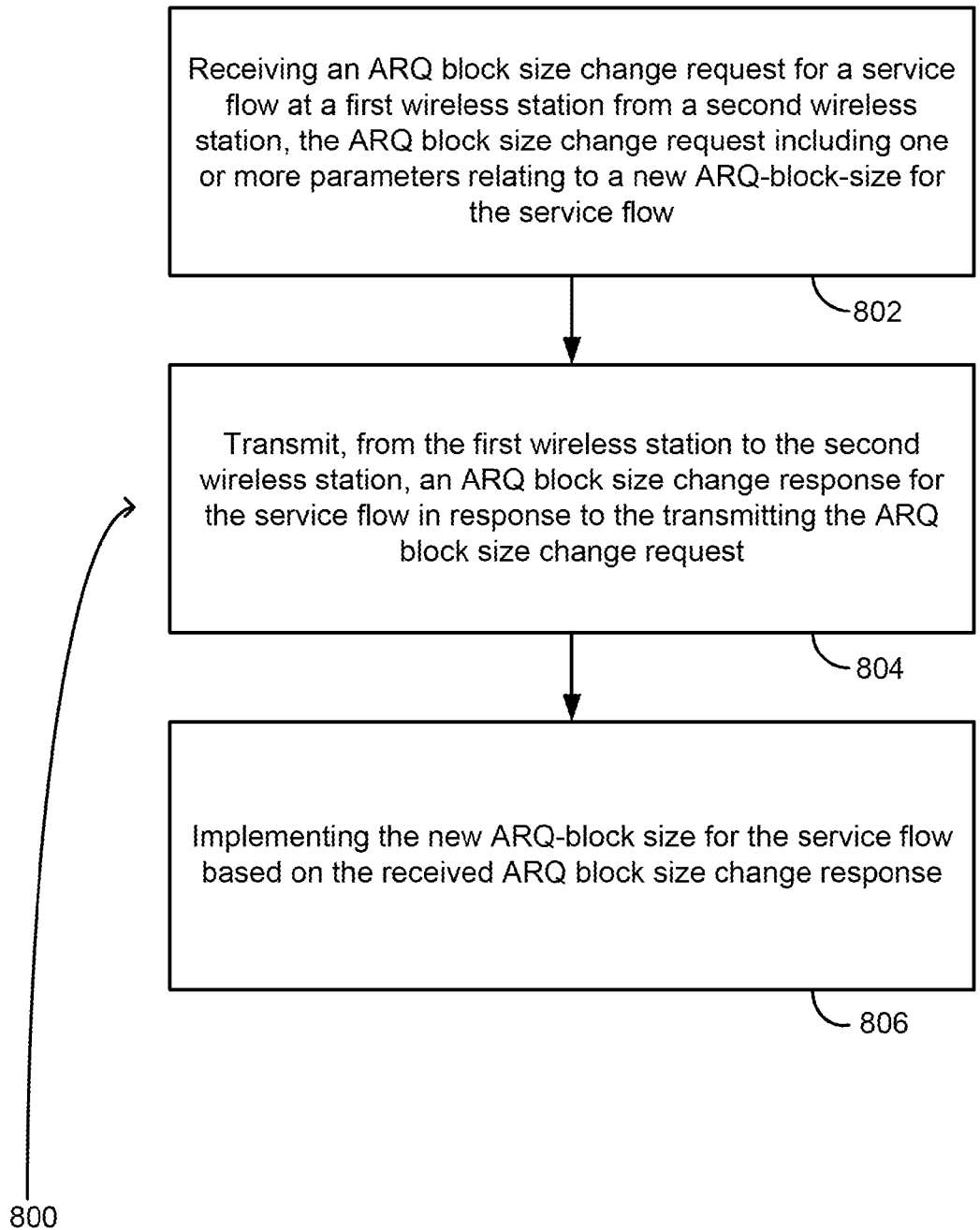
FIG. 8 is a flowchart of a method according to another example embodiment.

FIG. 8 is a flowchart of a method 800 according to an example embodiment. In this example, the method 800 may include: receiving an ARQ block size change request for a service flow at a first wireless station from a second wireless station, the ARQ block size change request including one or more parameters relating to a new ARQ-block-size for the service flow (802); transmitting, from the first wireless station to the second wireless station, an ARQ block size change response for the service flow in response to the transmitting the ARQ block size change request (804); and implementing the new ARQ-block size for the service flow based on the received ARQ block size change response (806).

An apparatus may include means for receiving (e.g., wireless transceiver) an ARQ block size change request for a service flow at a first wireless station from a second wireless station, the ARQ block size change request including one or more parameters relating to a new ARQ-block-size for the service flow; means for transmitting (e.g., wireless transceiver), from the first wireless station to the second wireless station, an ARQ block size change response for the service flow in response to the transmitting the ARQ block size change request; and means for implementing (e.g., processor) the new ARQ-block size for the service flow based on the received ARQ block size change response.

An apparatus may include at least one processor, a wireless transceiver, and at least one memory including computer program code configured to, with the at least one processor, cause the apparatus to: receive an ARQ block size change request for a service flow at a first wireless station from a second wireless station, the ARQ block size change request including one or more parameters relating to a new ARQ-block-size for the service flow; transmit, from the first wireless station to the second wireless station, an ARQ block size change response for the service flow in response to the transmitting the ARQ block size change request; and implement the new ARQ-block size for the service flow based on the received ARQ block size change response.

In an example embodiment, the apparatus may be configured to implement comprises the apparatus, at a base station, being configured to partition each of one or more MAC (media access control) protocol data units (PDUs) for transmission into one or more ARQ blocks, with each ARQ block, except a last ARQ block of a MAC PDU, having a fixed size equal to the new ARQ-block-size.

The apparatus may be configured to implement may include the apparatus, at a mobile station, being configured to receive and decode data based on the new ARQ-block size for the service flow.

Figure 9:
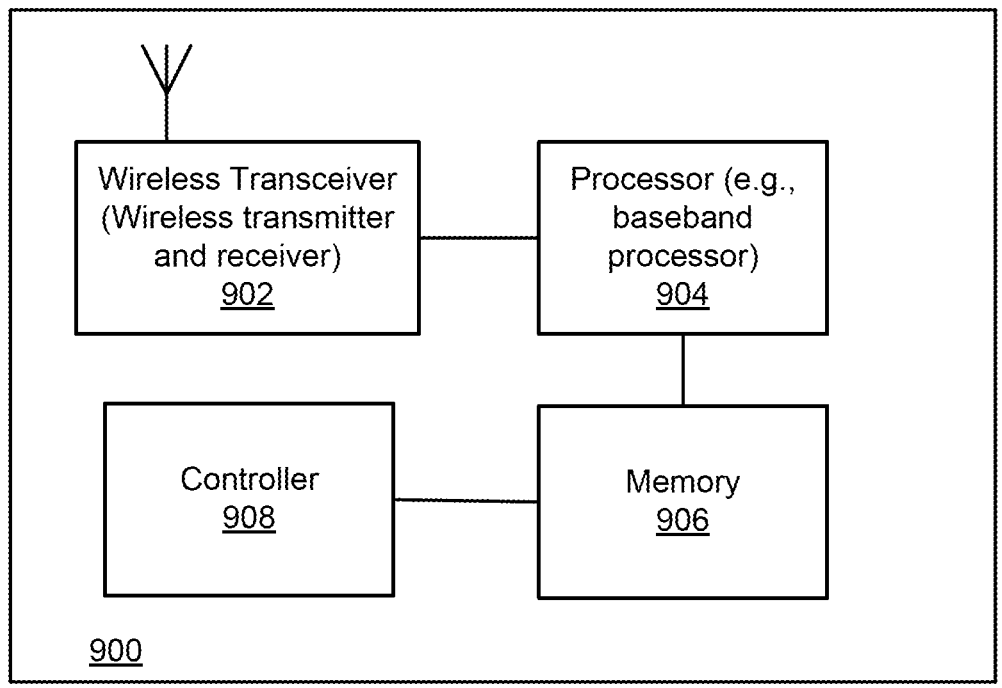
FIG. 9 is a block diagram of a wireless node according to an example embodiment.

FIG. 9 is a block diagram of a wireless station (or wireless node) 1600 according to an example embodiment. The wireless station 900 (e.g., base station 104 or mobile station 106) may include, for example, an RF (radio frequency) or wireless transceiver 902, including a transmitter to transmit signals and a receiver to receive signals, a processor 904 to execute instructions or software and control transmission and receptions of signals, and a memory 906 to store data and/or instructions.

Processor 904 may also make decisions or determinations, generate frames or messages for transmission, decode received frames or messages for further processing, and other tasks or functions described herein. Processor 904, which may be a baseband processor, for example, may generate messages, packets, frames or other signals for transmission via wireless transceiver 902. Processor 904 may control transmission of signals or messages over a wireless network, and may receive signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, a data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    participating in an automatic repeat request (ARQ)-enabled service flow between first and second wireless stations, wherein each transmitted MAC (media access control) protocol data unit (PDU) is partitioned into one or more ARQ-blocks, with each ARQ-block, except a last ARQ block of a MAC PDU, having a fixed size equal to an ARQ-block-size; and
    negotiating a change to the ARQ-block-size for the service flow via a request and response message exchange, wherein the negotiating comprises:
        transmitting a first message including an ARQ block size change request and an ARQ feedback request for the service flow from the first wireless station to the second wireless station, the ARQ block size change request including one or more parameters relating to a new ARQ-block-size for the service flow; and
        receiving, at the first wireless station from the second wireless station, a second message that includes an ARQ block size change response and an ARQ feedback response for the service flow, the ARQ feedback response providing acknowledgement information for one or more transmitted ARQ blocks.

2. The method of claim 1 wherein the participating comprises either transmitting or receiving data for the service flow.

3. The method of claim 1 wherein the participating comprises:
    establishing the ARQ-enabled service flow between the first and second wireless stations; and
    transmitting data from the first wireless station to the second wireless station for the ARQ-enabled service flow.

4. The method of claim 1 wherein the negotiating comprises:
    transmitting an ARQ block size change request for the service flow from the first wireless station to the second wireless station, the ARQ block size change request including one or more parameters relating to a new ARQ-block-size for the service flow;
    receiving, at the first wireless station from the second wireless station, an ARQ block size change response for the service flow in response to the transmitting the ARQ block size change request; and
    transmitting, from the first wireless station to the second wireless station, an ARQ block size change acknowledgement for the service flow in response to receiving the ARQ block size change response.

5. The method of claim 4 wherein the one or more parameters relating to the new ARQ-block-size include one or more of the following:
    the new ARQ-block size that identifies a new requested size of the ARQ blocks for the service flow;
    a time or frame offset that identifies when the new ARQ-block size will become effective; and/or
    a starting block sequence number associated with a first ARQ block that is transmitted on or after the time or frame offset when the new ARQ-block size will become effective.

6. The method of claim 4 wherein the one or more parameters relating to the new ARQ-block-size include:
    the new ARQ-block size that identifies a new requested size of the ARQ blocks for the service flow;
    a time or frame offset that identifies when the new ARQ-block size will become effective; and
    wherein a default value will be used as a starting block sequence number associated with a first ARQ block transmitted when the new ARQ-block size will become effective.

7. The method of claim 6 wherein the default value of the starting block sequence number is zero.

8. The method of claim 1 wherein the negotiating comprises:
    receiving an ARQ block size change request for the service flow at the first wireless station from the second wireless station, the ARQ block size change request including one or more parameters relating to a new ARQ-block-size for the service flow;
    transmitting, from the first wireless station to the second wireless station, an ARQ block size change response for the service flow in response to the receiving the ARQ block size change request; and
    receiving, at the first wireless station from the second wireless station, an ARQ block size change acknowledgement for the service flow in response to the transmitting the ARQ block size change response.

9. The method of claim 1, and further comprising performing the following prior to the negotiating:
    transmitting, from the first wireless station to the second wireless station, an ARQ feedback request; and
    receiving an ARQ feedback response that provides acknowledgement information for one or more transmitted ARQ blocks.

10. The method of claim 1, and further comprising performing the following prior to the negotiating:
    receiving, at the first wireless station from the second wireless station, an ARQ feedback request; and
    transmitting an ARQ feedback response that provides acknowledgement information for one or more transmitted ARQ blocks.

11. The method of claim 1 and further comprising:
    transmitting, from the first wireless station to the second wireless station, a third message that includes an ARQ block size change acknowledgement for the service flow in response to receiving the ARQ block size change response.

12. The method of claim 1 wherein the negotiating comprises:
negotiating a change to the ARQ-block-size for the service flow via an IEEE 802.16 dynamic service change (DSC) request and a dynamic service change (DSC) response message exchange.

13. The method of claim 1 wherein the negotiating comprises:
transmitting, from the first wireless station to the second wireless station, an ARQ block size change request for the service flow, the ARQ block size change request including one or more parameters relating to a new ARQ-block-size for the service flow; and
wherein the transmitting the ARQ block size change request is performed in response to one or more of the following:
one or more QoS parameters for the first wireless station for the service flow, or a change thereof;
a buffer capacity for the first wireless station for the service flow, or a change thereof; and/or
a measured channel quality for the service flow as measured by the first wireless station, or a change thereof, the measured channel quality including one or more of a measured received signal strength, measured interference, a measured signal to interference and noise ratio, and/or a measured error rate.

14. A method comprising:
participating in an automatic repeat request (ARQ)-enabled service flow between first and second wireless stations, wherein each transmitted MAC (media access control) protocol data unit (PDU) is partitioned into one or more ARQ-blocks, with each ARQ-block, except a last ARQ block of a MAC PDU, having a fixed size equal to an ARQ-block-size; and
negotiating a change to the ARQ-block-size for the service flow via a request and response message exchange,
wherein the negotiating comprises:
receiving, at the first wireless station from the second wireless station, a first message that includes an ARQ block size change request and an ARQ feedback request for the service flow, the ARQ block size change request including one or more parameters relating to a new ARQ block size for the service flow; and
transmitting, from the first wireless station to the second wireless station, a second message that includes an ARQ block size change response and an ARQ feedback response for the service flow, the ARQ feedback response providing acknowledgement information for one or more transmitted ARQ blocks.

15. An apparatus comprising:
at least one processor;
at least one memory including computer program code configured to, with the at least one processor, cause the apparatus at least to:
participate in an automatic repeat request (ARQ)-enabled service flow between first and second wireless stations, wherein each transmitted MAC (media access control) protocol data unit (PDU) is partitioned into one or more ARQ-blocks, with each ARQ-block, except a last ARQ_block of a MAC PDU, having a fixed size equal to an ARQ-block-size; and
negotiate a change to the ARQ-block-size for the service flow via a request and response message exchange,
wherein the negotiating comprises:
transmitting a first message including an ARQ block size change request and an ARQ feedback request for the service flow from the first wireless station to the second wireless station, the ARQ block size change request including one or more parameters relating to a new ARQ-block-size for the service flow; and
receiving, at the first wireless station from the second wireless station, a second message that includes an ARQ block size change response and an ARQ feedback response for the service flow, the ARQ feedback response providing acknowledgement information for one or more transmitted ARQ blocks.

16. An apparatus comprising:
at least one processor; and
at least one memory including computer program code configured to, with the at least one processor, cause the apparatus at least to:
transmit an ARQ block size change request for a service flow from a first wireless station to a second wireless station, the ARQ block size change request including one or more parameters relating to a new ARQ-block-size for the service flow;
receive, at the first wireless station from the second wireless station, an ARQ block size change response for the service flow in response to the transmitting the ARQ block size change request; and
implement the new ARQ-block size for the service flow based on the received ARQ block size change response,
wherein the one or more parameters include a time or frame offset that identifies when the new ARQ-block size will become effective.

17. The apparatus of claim 16 wherein the one or more parameters include the following:
the new ARQ-block size that identifies a new requested size of the ARQ blocks for the service flow;
the time or frame offset that identifies when the new ARQ-block size will become effective; and
a starting block sequence number associated with a first ARQ block that is transmitted on or after the time or frame offset when the new ARQ-block size will become effective.

18. The apparatus of claim 16 wherein the one or more parameters include:
the new ARQ-block size that identifies a new requested size of the ARQ blocks for the service flow; and
the time or frame offset that identifies when the new ARQ-block size will become effective;
wherein a default value will be used for a starting block sequence number at the start of when the new ARQ-block size will become effective.

19. The apparatus of claim 18 wherein the default value for a starting block sequence number is zero.

20. The apparatus of claim 16 wherein:
the transmitting comprises transmitting a dynamic service change request indicating an ARQ block size change request; and
the receiving comprises receiving a dynamic service change response for the ARQ block size change request.

21. The apparatus of claim 16 wherein the implementing comprises partitioning each of one or more MAC (media access control) protocol data units (PDUs) for transmission into one or more ARQ blocks, with each ARQ block, except a last ARQ block of a MAC PDU, having a fixed size equal to the new ARQ-block-size.

22. The apparatus of claim 16 wherein the implementing comprises the receiving and decoding data based on the new ARQ-block size for the service flow.

23. The apparatus of claim 16, wherein the at least one processor and at least one memory are further configured to cause the apparatus to transmit, from the first wireless station to the second wireless station, an ARQ block size change acknowledgement for the service flow in response to receiving the ARQ block size change response.

24. The apparatus of claim 23 wherein:
at least one processor and at least one memory are further configured to cause the apparatus to partition each of one or more MAC (media access control) protocol data units (PDUs) for transmission into one or more ARQ blocks, with each ARQ block, except a last ARQ block of a MAC PDU, having a fixed size equal to an ARQ-block-size; and
the implementing comprises partitioning MAC PDUs into ARQ blocks using the new ARQ block size.

25. An apparatus comprising:
at least one processor; and
at least one memory including computer program code configured to, with the at least one processor, cause the apparatus at least to:
transmit an ARQ block size change request for a service flow from a first wireless station to a second wireless station, the ARQ block size change request including one or more parameters relating to a new ARQ-block-size for the service flow;
receive, at the first wireless station from the second wireless station, an ARQ block size change response for the service flow in response to the transmitting the ARQ block size change request; and
implement the new ARQ-block size for the service flow based on the received ARQ block size change response, wherein:
the transmitting comprises transmitting the ARQ block size change request and an ARQ feedback request for the service flow from the first wireless station to the second wireless station, the ARQ block size change request including one or more parameters relating to a new ARQ-block-size for the service flow; and
the receiving comprises receiving the ARQ block size change response and an ARQ feedback response for the service flow, the ARQ feedback response providing acknowledgement information for one or more transmitted ARQ blocks.

26. A method comprising:
participating in an automatic repeat request (ARQ)-enabled service flow between first and second wireless stations, wherein each transmitted MAC (media access control) protocol data unit (PDU) is partitioned into one or more ARQ-blocks, with each ARQ-block, except a last ARQ block of a MAC PDU, having a fixed size equal to an ARQ-block-size; and
negotiating a change to the ARQ-block-size for the service flow via a request and response message exchange, the negotiating comprising transmitting an ARQ block size change request for the service flow from the first wireless station to the second wireless station, the ARQ block size change request including one or more parameters relating to a new ARQ-block-size for the service flow,
wherein the one or more parameters relating to the new ARQ-block-size include a time or frame offset that identifies when the new ARQ-block size will become effective.

* * * * *

UNITED STATES PATENT AND TRADEMARK OFFICE
CERTIFICATE OF CORRECTION

PATENT NO. : 8,457,057 B2
APPLICATION NO. : 12/761580
DATED : June 4, 2013
INVENTOR(S) : Shashikant Maheshwari et al.

Page 1 of 1

It is certified that error appears in the above-identified patent and that said Letters Patent is hereby corrected as shown below:

In the Claims:

In column 15, line 64, in Claim 15, delete "ARQ_block" and insert -- ARQ-block --, therefor.

Signed and Sealed this
Tenth Day of September, 2013

Teresa Stanek Rea
*Acting Director of the United States Patent and Trademark Office*